US009568048B2

(12) United States Patent
Jung et al.

(10) Patent No.: US 9,568,048 B2
(45) Date of Patent: Feb. 14, 2017

(54) BEARING CAP

(71) Applicant: Ford Global Technologies, Dearborn, MI (US)

(72) Inventors: Markus Jung, Cologne (DE); Carsten Kremer, Roetgen (DE); Gerd Bruessler, Bergisch Gladbach (DE); Stephan Weykam, Rommerskirchen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 14/593,229

(22) Filed: Jan. 9, 2015

(65) Prior Publication Data

US 2015/0198203 A1    Jul. 16, 2015

(30) Foreign Application Priority Data

Jan. 10, 2014    (DE) .................. 10 2014 200 273

(51) Int. Cl.
*F16C 33/72*    (2006.01)
*F16C 41/00*    (2006.01)
*G01P 3/44*    (2006.01)

(52) U.S. Cl.
CPC ............. *F16C 33/723* (2013.01); *F16C 41/00* (2013.01); *G01P 3/443* (2013.01); *F16C 2326/02* (2013.01)

(58) Field of Classification Search
CPC ....... F16C 33/723; F16C 41/00; F16C 41/007; F16C 2326/02; B60B 27/0068; G01P 3/443
See application file for complete search history.

(56) References Cited

U.S. PATENT DOCUMENTS

| 5,451,869 | A * | 9/1995 | Alff .................. G01P 3/443 324/173 |
| 6,593,733 | B1 * | 7/2003 | Nicot ................ F16C 41/04 324/207.25 |
| 6,877,903 | B2 * | 4/2005 | Aiba .................. F16C 41/007 324/173 |
| 7,547,145 | B2 * | 6/2009 | Yamamoto ........... F16C 41/007 324/207.25 |
| 7,942,582 | B2 * | 5/2011 | Maeda ................ B60B 27/00 384/448 |
| 8,123,410 | B2 * | 2/2012 | Masuda ............. B60B 27/0005 384/448 |
| 8,356,940 | B2 * | 1/2013 | Inoue ................. B60B 27/0005 384/448 |
| 8,360,649 | B2 * | 1/2013 | Norimatsu ......... B60B 27/0005 384/448 |
| 8,393,795 | B2 * | 3/2013 | Aritake ............... F16C 33/768 384/448 |

(Continued)

FOREIGN PATENT DOCUMENTS

| DE | 196 36 173 A1 | 9/1996 |
| DE | 102 29 589 A1 | 8/2001 |

(Continued)

*Primary Examiner* — Alan B Waits
(74) *Attorney, Agent, or Firm* — Angela M. Brunetti; Raymond Coppiellie

(57) ABSTRACT

A bearing cap having a top wall, a side wall extending away from the top wall, a peripheral wall extending away from the top wall forming a receiver, a bottom wall closes the receiver at an axial end facing the top wall, and at least one opening is formed by the peripheral wall to drain moisture from the receiver.

10 Claims, 5 Drawing Sheets

(56) References Cited

U.S. PATENT DOCUMENTS

| | | | | |
|---|---|---|---|---|
| 8,534,126 | B2* | 9/2013 | Serafini | F16C 33/723 384/448 |
| 9,056,523 | B2* | 6/2015 | Norimatsu | B60B 27/0068 |
| 2003/0218457 | A1* | 11/2003 | Aiba | F16C 41/007 324/174 |
| 2006/0228062 | A1 | 10/2006 | Nagata et al. | |
| 2011/0088467 | A1* | 4/2011 | Serafini | F16C 33/723 73/431 |
| 2012/0281939 | A1* | 11/2012 | Nakamura | B60B 27/0005 384/477 |
| 2015/0069826 | A1* | 3/2015 | Suzuki | F16C 33/768 301/109 |
| 2015/0231922 | A1* | 8/2015 | Kaiser | B60B 27/0073 384/479 |
| 2016/0009128 | A1* | 1/2016 | Wakatsuki | F16C 33/723 384/448 |

FOREIGN PATENT DOCUMENTS

| | | |
|---|---|---|
| DE | 10 2006 033931 A1 | 7/2006 |
| DE | 10 2008 006605 A1 | 1/2008 |
| DE | 10 2012 217030 A1 | 9/2012 |
| EP | 1 351 059 A2 | 3/2002 |
| EP | 1 746426 B1 | 7/2005 |
| FR | 2 907 523 A1 | 10/2006 |
| FR | WO 2012023000 A1 * 2/2012 | ........... F16C 33/7886 |
| FR | WO 2012023001 A1 * 2/2012 | ........... F16C 33/7886 |

\* cited by examiner

BEARING CAP

CROSS-REFERENCE TO RELATED APPLICATIONS

This application claims priority to DE Application No. 10 2014 200273.7, filed Jan. 10, 2014, the disclosure of which is incorporated in its entirety by reference herein.

TECHNICAL FIELD

The embodiments disclosed herein relate to a bearing, cap and more particularly to a bearing cap for receiving a sensor.

BACKGROUND

Bearing caps are designed to receive a sensor element, such as an ABS sensor or a rotational speed sensor. An ingress of water leads to premature failure of the bearing assembly and subsequently, replacement of the wheel bearing. Therefore, the sensor element must be protected, or sealed, from water.

Some bearing caps are configured to have two open axial ends. For this configuration, the sensor element is received into a hollow cylindrical receiver and is sealed by an O-ring in the direction of the bearing cap in order to prevent the penetration of water or other substances from damaging the sensor element. The additional element of an O-ring is a drawback to this configuration and, in practice, it has proven that water may still enter into the interior of the bearing cap. Any ingress of water, however, leads to premature failure of the bearing assembly, which ultimately, must be replaced.

In another configuration, the receiver for the sensor element may be integrated into a top wall of the bearing cap and the receiver is closed on an axial end facing the bearing assembly by means of a bottom wall so that the receiver is of a "pot-shaped" configuration. However, in practice water or moisture collects in the sensor receiver and permanent contact of the sensor element held in the receiver, may lead to partial or complete loss of the sensor signal.

SUMMARY

A bearing cap having a top wall, a side wall extending away from the top wall and a peripheral wall extending away from the top wall firming a receiver. A bottom wall closes the receiver at an axial end facing the top wall. At least one opening is formed by the peripheral wall to drain moisture from the receiver.

A bearing cap having a top wall, a side wall extending away from the top wall and a peripheral wall extending away from the top wall forming a receiver. A bottom wall closes the receiver at an axial end facing the top wall. A wall element attached to and extending away from the top wall, wall element, is spaced a predetermined distance from the peripheral wall. At least one opening is formed by the peripheral wall to drain moisture from the receiver.

A bearing cap having a top wall, a side wall extending away from the top wall and a peripheral wall extending away from the top wall forming a receiver. A bottom wall closes the receiver at an axial end facing the top wall. The peripheral wall is completely closed in a peripheral direction and defines a plurality of receiver walls and a plurality of drainage walls. The drainage walls at spaced, in a radial direction, further apart from a central longitudinal axis of the receiver than the receiver walls thereby forming at least one opening and draining moisture from the receiver. A bottom wall closes the receiver at an axial end facing the top wall.

Elements and steps in the figures are illustrated for simplicity and clarity and have not necessarily been rendered according to any particular sequence. For example, steps that may be performed concurrently or in different order are illustrated in the figures to help to improve understanding of embodiments of the inventive subject matter.

DESCRIPTION OF INVENTION

While various aspects of the inventive subject matter are described with reference to a particular illustrative embodiment, the inventive subject matter is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Figure 1:
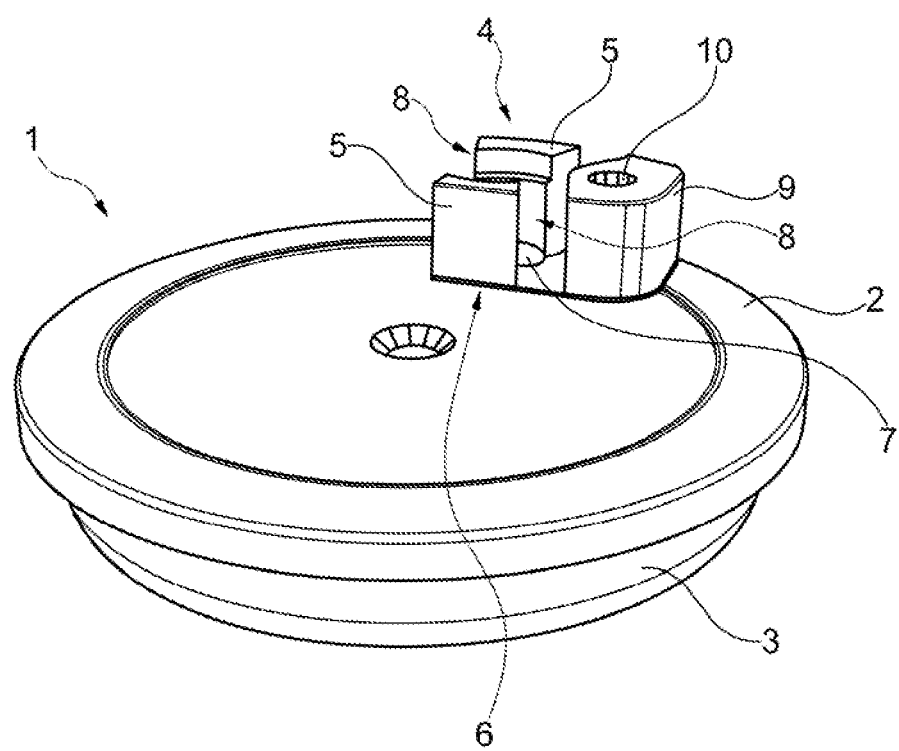
FIG. 1 is a perspective view of as bearing cap according to one or more embodiments of the inventive subject matter.

FIG. 1 shows a perspective view of a bearing cap 1 according to one or more embodiments of the inventive subject matter. The bearing cap 1 shown has a top wall 2 and a side wall 3. The top wall 2 and a side wall 3 extending away from the top wall 2. The top wall 2 has a substantially circular disk shape, whereas the side wall 3 has a substantially hollow cylindrical configuration. The side wall 3 is capable of being sealingly connected to a fixed component, for example a fixed bearing ring, of a bearing assembly (not shown) to be sealed. An example of a bearing assembly may be a wheel bearing of a vehicle.

A receiver 4 for a sensor element (not shown), for example an ABS sensor, is formed by a peripheral wall 5. The receiver 4 extends away from the top wall 2 in a direction which substantially opposes the direction of extension of the side wall 3. The sensor element received in the bearing cap 1 may be an anti-lock braking system (ABS) sensor for detecting a rotational movement of the bearing assembly. The side wall of the bearing cap may be configured such that it forms a sealed connection with a fixed part of the bearing assembly, such as a fixed bearing ring of a wheel bearing so that no substances damaging the bearing assembly may penetrate from outside into the veering assembly via the side wall.

To seal the receiver 4 relative to the bearing assembly (not shown) the receiver 4 is closed at an end 6 facing the top wall 2 by means of a bottom all 7 toward the bearing assembly. The bottom wall 7 has a reduced wall thickness compared to the top wall 2 in order to avoid reading errors of the sensor element received in the receiver 4. As a result, the penetration of dust or water through the receiver for the sensor element into the bearing assembly is prevented so that the veering cap 1 may ensure a reliable seal of the bearing assembly against substances damaging the bearing assembly, for example dust and/or water.

The peripheral wall 5 of the bearing cap 1 has at least one opening 8. FIG. 1 shows two openings 8. Each opening has a slot-shaped configuration for drainage. The drainage openings 8 diametrically oppose each other. The diametrical arrangement of the slots ensures a sufficient stability of the peripheral wall 5 forming the receiver 4, in site of the generally enlarged drainage openings 8, so that the sensor element may be held in an accurate position by the bearing cap 1. The openings 8 extend substantially parallel to a central longitudinal axis defined by the receiver 4 and extend over the entire axial length of the peripheral all 5 so that only two all segments may be seen. In this manner, it is ensured that water or moisture is not able to collect at any point of the receiver. Water which may have penetrated into the receiver 4 will drain off from the entire receiver by way of the drainage openings 8. The wall segments represent a sufficiently stable and accurate bearing for receiving the sensor element. The drainage openings 8 ensure effective dehumidifying of the entire receiver 4 so that no water or moisture may collect inside the receiver 4. The term "opening" within the meaning of the inventive subject matter is to be interpreted as broadly as possible and may, for example, encompass not only an open point, such as a hole, in an otherwise closed surface or a closed body, but also a through-passage between objects.

Due to the bottom wall 7 of the receiver and the drainage openings 8 present as described herein, the use of an O-ring for sealing the sensor element relative to the bearing cap may be dispensed with. Generally, the structure of the bearing cap and, in particular, the mounting of the sensor element in the receiver of the bearing cap may be simplified. Further, moisture present in the receiver 4 may drain out directly through the opening 8 in the peripheral wall 5 so that no moisture may collect in the receiver 4 for the sensor element.

A fastening device 9 may be provided adjacent to the receiver 4 for fixing the sensor element in the mounted state. In the example bearing cap 1 shown in FIG. 1 the sensor element (not shown) is mounted to the fastening device 9 or the bearing cap 1 by way of a screw connection held in a threaded bore 10. The fastening device 9 may be arranged spaced apart from the peripheral wall 5 of the receiver 4 so as not to hinder the drainage of water from the openings 8.

Figure 2:
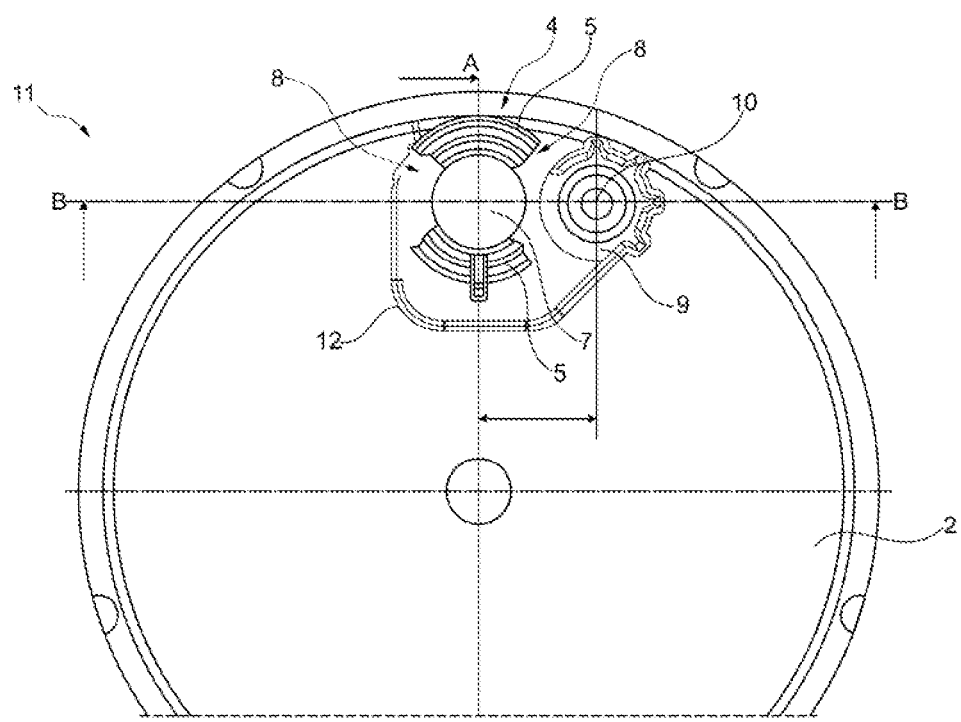
FIG. 2 is a plan view of a bearing cap according to one or more embodiments of the inventive subject matter.
Figure 3:
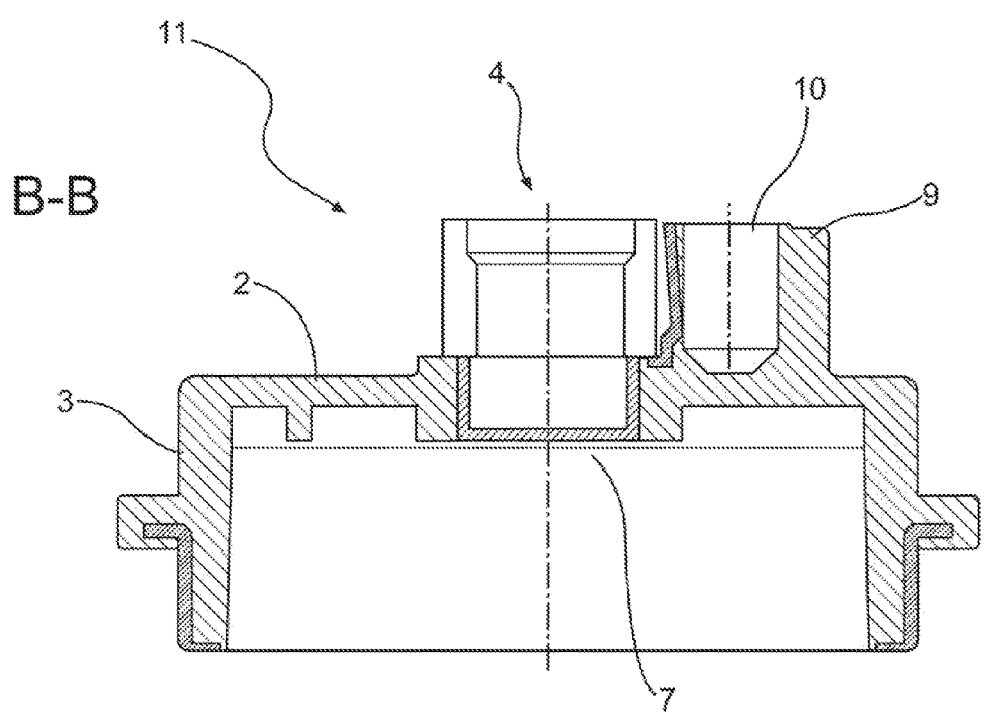
FIG. 3 is a sectional view of the bearing cap shown in FIG. 2 along line B-B.

FIG. 2 is a plan view of as bearing cap 11 according to the inventive subject matter. The bearing cap 11 shown in FIG. 2 has an additional wall element 12 attached to and extending away from the top wall 2. Wall element 12 reinforces the region around the receiver 4. The wall element 12 is spaced a predetermined distance from the peripheral wall 5 so as not to hinder the drainage of water from the openings 8. FIG. 3 is a sectional view of the bearing cap 11 along line B-B in FIG. 2.

Figure 4:
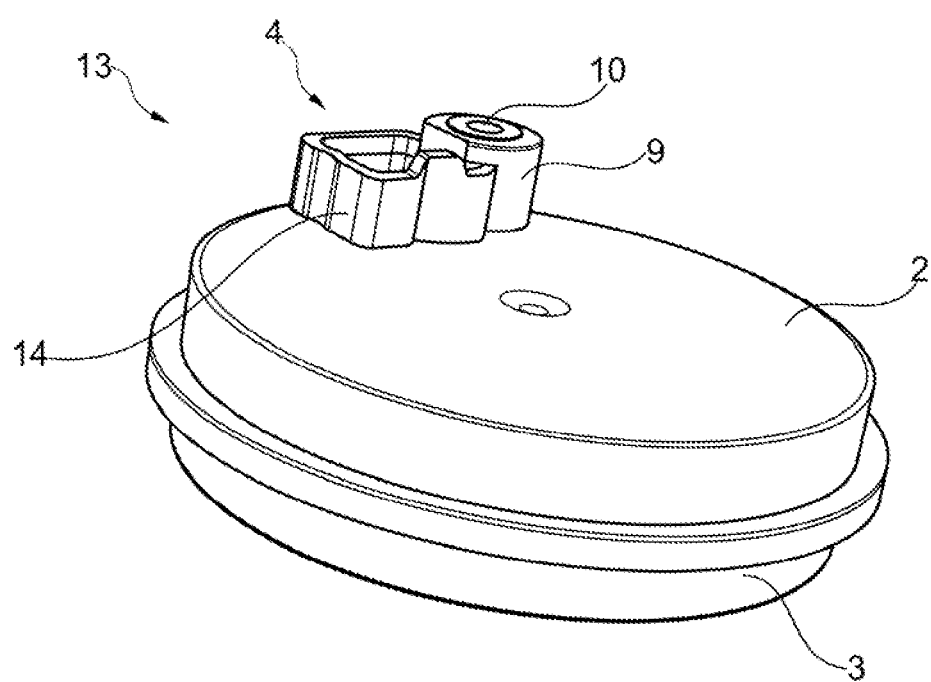
FIG. 4 is a perspective side view of a bearing cap according to one or more embodiments of the inventive subject matter.
Figure 5:
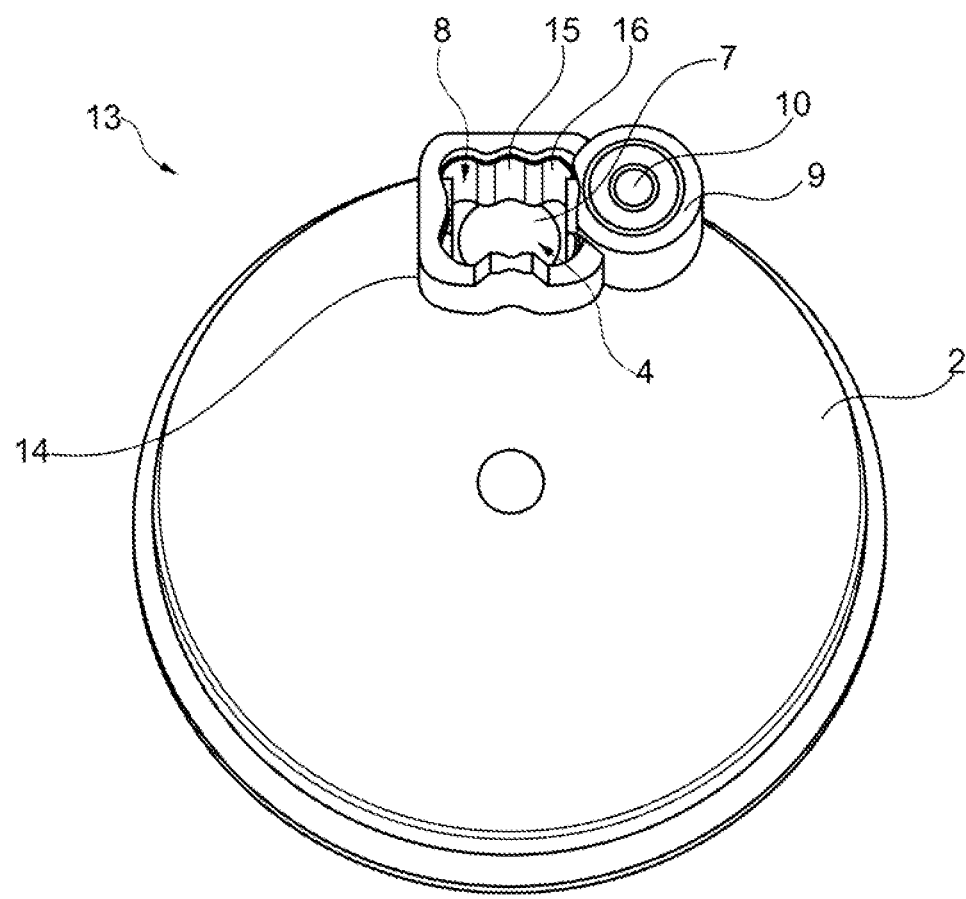
FIG. 5 is a perspective view of the bearing cap shown in FIG. 4.

FIG. 4 is a perspective side view of one or more embodiments of a bearing cap 13 of the inventive subject matter. FIG. 5 is a perspective top view of the bearing cap 13. As shown in FIGS. 4 and 5, a peripheral wall 14 forms the receiver 4 for the sensor element (not shown) is completely closed in the peripheral direction in contrast to the peripheral all 5 shown in FIG. 1. In FIGS. 4 and 5, the peripheral wall 14 of the bearing cap 13 forms both the receiver 4 and four drainage openings 8, in that the peripheral all 14 in the peripheral direction comprises four receiver walls 15 for forming the receiver 4 for the sensor element (not shown) and four drainage walls 16 for forming the drainage openings 8. The drainage walls 16, in the radial direction, are spaced further apart from a central longitudinal axis defined by the receiver 4 than the receiver walls 15. As a result, the drainage walls 16 of the bearing cap 13 form openings between an outer face of the sensor element to be inserted in the receiver 4 and an inner face of the peripheral wall 14. The openings 8 produce sufficient dehumidifying of the receiver 4, so that no water is able to collect in the receiver, saving the sensor element from damage.

The stability of the peripheral wall 14 may be increased by the peripheral wall being designed, for example, to be closed in the peripheral direction while a drainage opening is formed in the direction of the receiver for draining moisture from the receiver.

In the foregoing specification, the invention has been described with reference to specific exemplary embodiments. Various modifications and changes may be made, however, without departing from the scope of the inventive subject matter as set forth in the claims. Additionally, the components and/or elements recited in any apparatus claims may be assembled or otherwise operationally configured in a variety of permutations and are accordingly not limited to the specific configuration recited in the claims. For example, the receiver and/or the sensor element may also be configured in different geometric designs compared to the substantially round cross section shown in FIGS. 1 through 5. For example, rectangular or oval cross sections may be implemented. Further, the bearing cap may be used for sealing a wheel bearing of a non-driven vehicle axle of a motor vehicle, wherein a rotational movement of the wheel bearing may be determined by means of a sensor element held by the bearing cap, such as an ABS sensor. The specification and figures are illustrative, rather than restrictive, and modifications are intended to be included within the scope of the inventive subject matter. Accordingly, the scope of the inventive subject matter should be determined by the claims and their legal equivalents rather than by merely the examples described.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

The invention claimed is:

1. A bearing cap, comprising:
   a top wall;
   a side wall extending away from the top wall;
   a peripheral wall formed by at least two peripheral wall segments extending away from the top wall and forming a receiver, the at least two peripheral wall segments are circumferentially spaced defining at least one discontinuity in the circumferential direction such that no wall exists circumferentially between the at least two peripheral wall segments,
   a bottom wall closes the receiver at an axial end closest to the top wall; and at least one opening in the peripheral wall is defined by the at least one discontinuity and extends along an entire axial length of the peripheral wall parallel to a central longitudinal axis defined by the receiver.

2. The bearing cap as claimed in claim 1 wherein the at least one opening has a slot-shaped configuration.

3. The bearing cap as claimed in claim 2 wherein the at least one slot-shaped opening extends over the entire axial length of the peripheral wall.

4. The bearing cap as claimed in claim 2 where in the at least one slot-shaped opening further comprises a first slot-shaped opening diametrically opposing a second slot-shaped opening.

5. The bearing cap as claimed in claim 4 wherein the first and second slot-shaped openings extend parallel to a central longitudinal axis defined by the receiver.

6. The bearing cap as claimed in claim 5 wherein the first and second slot-shaped openings extend over an entire axial length of the peripheral wall.

7. The bearing cap as claimed in claim 1 further comprising a wall element attached to and extending away from the top wall, the wall element surrounds the receiver.

8. The bearing cap as claimed in claim 7 wherein the at least one opening has a slot-shaped configuration.

9. The bearing cap as claimed in claim 8 wherein the at least one slot-shaped opening extends over an entire axial length of the peripheral wall.

10. The bearing cap as claimed in claim 8 further comprising a first slot-shaped opening diametrically opposing a second slot-shaped opening.

* * * * *